United States Patent
Wang et al.

(10) Patent No.: US 10,410,345 B2
(45) Date of Patent: Sep. 10, 2019

(54) IMAGE PROCESSING DEVICE AND IMAGE PROCESSING METHOD

(71) Applicant: Fujitsu Limited, Kawasaki-shi, Kanagawa (JP)

(72) Inventors: Mengjiao Wang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/827,570

(22) Filed: Nov. 30, 2017

(65) Prior Publication Data
US 2018/0240232 A1 Aug. 23, 2018

(30) Foreign Application Priority Data
Feb. 23, 2017 (CN) .......................... 2017 1 0099564

(51) Int. Cl.
| | |
|---|---|
| *G06T 7/00* | (2017.01) |
| *G06T 7/187* | (2017.01) |
| *G06T 7/11* | (2017.01) |
| *G06T 7/174* | (2017.01) |

(52) U.S. Cl.
CPC .............. *G06T 7/0012* (2013.01); *G06T 7/11* (2017.01); *G06T 7/174* (2017.01); *G06T 7/187* (2017.01); *G06T 2207/10081* (2013.01); *G06T 2207/20156* (2013.01); *G06T 2207/30061* (2013.01)

(58) Field of Classification Search
USPC .................................................. 382/128, 131
See application file for complete search history.

(56) References Cited

U.S. PATENT DOCUMENTS

| | | | |
|---|---|---|---|
| 6,246,784 B1* | 6/2001 | Summers ........... | G06K 9/00201 382/128 |
| 2005/0207630 A1* | 9/2005 | Chan ..................... | A61B 6/466 382/131 |
| 2009/0185731 A1* | 7/2009 | Ray ....................... | G06T 7/0012 382/131 |
| 2010/0231605 A1* | 9/2010 | Moriya ................. | G06F 19/321 345/619 |
| 2012/0063659 A1* | 3/2012 | Wang .................... | G06T 11/006 382/131 |
| 2016/0005162 A1* | 1/2016 | Markov .................... | G06T 7/11 382/128 |

(Continued)

*Primary Examiner* — Fayyaz Alam
(74) *Attorney, Agent, or Firm* — Staas & Halsey LLP

(57) ABSTRACT

An image processing device and an image processing method are provided. The image processing device includes: an acquisitor configured to acquire multiple slice images arranged in an order; a selector configured to detect the multiple slice images sequentially, to determine a reference slice image and a reference trachea region in the reference slice image; and a branch point determiner configured to determine, with a region growing method, trachea regions of slice images following the reference slice image sequentially by using the reference trachea region as a seed region, and determine connectivity of the trachea regions, until a branch point slice image is determined, where a trachea region of the branch point slice image includes two disconnected regions. With the image processing device and the image processing method, manual intervention can be reduced and a position of the branch point can be determined more accurately.

16 Claims, 5 Drawing Sheets

(56) References Cited

U.S. PATENT DOCUMENTS

2016/0125604 A1\* 5/2016 Wang .................. G06T 7/11
                                                    382/128
2017/0206662 A1\* 7/2017 Wang .................. G06T 7/136
2017/0249744 A1\* 8/2017 Wang .................. G06T 7/11

\* cited by examiner

IMAGE PROCESSING DEVICE AND IMAGE PROCESSING METHOD

CROSS-REFERENCE TO RELATED APPLICATIONS

This application claims the benefit and priority of Chinese Application No. 201710099564.9, filed on Feb. 23, 2017, entitled "image processing device and image processing method", the entire disclosure of which is incorporated herein by reference.

BACKGROUND

1. Field

The embodiments of the present disclosure relates to the field of image processing, and, in particular, to an image processing device and an image processing method for determining a position of a branch point between a trachea and bronchi, as well as an image processing device and an image processing method for determining a lung region.

2. Description of the Related Art

The background part provides background information related to the present disclosure, which is not necessarily the conventional technology.

In determining a three-dimensional shape of a lung, three-dimensional marking points of the lung, including a branch point between a main trachea and bronchi as well as an upper edge and a lower edge of a left lung and an upper edge and a lower edge a right lung, are used. In the existing method for detecting a branch point of a main trachea and bronchi, a trachea region is extracted from a three-dimensional image of a whole lung, and then a skeleton structure of the trachea is analyzed by a thinning algorithm, so that a connection point between skeletons of the main trachea and primary bronchi is determined as a branch point. With this method, in order to extract the trachea region, a seed point for region growth is to be selected manually, which is not suitable for processing a large amount of image data. In addition, high robustness cannot be achieved with the thinning algorithm, thereby resulting in a noise on the skeleton structure of the trachea and an erroneous detection to the branch point.

In the existing method for detecting an upper edge and a lower edge of a lung, pixels having gray values within a certain range are extracted in the lung image as a lung region, to determine the upper edge and the lower edge of the lung region. With this method, only information on gray of the pixels is taken into account, resulting in that other portions having similar information on gray, such as an intestine region, may be identified as the lung region, the regions detected erroneously may affect the detection on the upper edge and the lower edge of the lung.

For the above technical problem, it is desirable in the present disclosure to propose a scheme, to accurately detect a position of a branch point and a lung region.

SUMMARY

Additional aspects and/or advantages will be set forth in part in the description which follows and, in part, will be apparent from the description, or may be learned by practice thereof.

This summary part provides a general summary of the present disclosure, rather than discloses a full scope or all features thereof.

An object of the present disclosure is to provide an image processing device and an image processing method, to accurately detect positions of a branch point and a lung region.

According to an aspect of the present disclosure, an image processing device is provided, which includes: an acquisitor configured to acquire multiple slice images arranged in an order; a selector configured to detect the multiple slice images sequentially, to determine a reference slice image and a reference trachea region in the reference slice image; and a branch point determiner configured to determine, with a region growing method, trachea regions of slice images following the reference slice image sequentially by using the reference trachea region as a seed region, and determine connectivity of the trachea regions of the slice images following the reference slice image sequentially, until a branch point slice image where a branch point between a trachea and bronchi is located is determined. A trachea region of the branch point slice image includes two disconnected regions.

According to another aspect of the present disclosure, an image processing method is provided, which includes: acquiring multiple slice images arranged in an order; detecting the multiple slice images sequentially, to determine a reference slice image and a reference trachea region in the reference slice image; and determining, with a region growing method, trachea regions of slice images following the reference slice image sequentially by using the reference trachea region as a seed region, and determining connectivity of the trachea regions of the slice images following the reference slice image sequentially, until a branch point slice image where a branch point between a trachea and bronchi is located is determined. A trachea region of the branch point slice image includes two disconnected regions.

According to another aspect of the present disclosure, a program product including machine-readable instruction codes stored therein is provided, where, when being read and executed by a computer, the instruction codes enable the computer to perform the image processing method according to the present disclosure.

According to another aspect of the present disclosure, a non-transitory machine-readable storage medium on which a program product including machine-readable instruction codes stored therein is carried is provided, where, when being read and executed by a computer, the instruction codes enable the computer to perform the image processing method according to the present disclosure.

With the image processing device and the image processing method according to the present disclosure, a reference slice image and a reference trachea region serving as a seed region can be determined in multiple slice images, and connectivity of trachea regions in slice images following the reference slice image can be determined sequentially with the region growing method, thereby determining a branch point slice image. In this way, the reference trachea region serving as the seed region can be automatically determined, thereby reducing manual intervention and improving accuracy of the seed region. Further, the branch point is determined based on the connectivity of the trachea regions, so that the determined branch point is more accurate and noise can be avoided, thereby detecting the lung region more accurately subsequently.

The description and specific examples in the summary are only illustrative and are not intended to limit the scope of the present disclosure.

BRIEF DESCRIPTION OF THE DRAWINGS

The drawings described herein are used for illustrating the selected embodiments, rather than all of the possible embodiments, and are not intended to limit the scope of the present disclosure. In the drawings.

Figure 1:
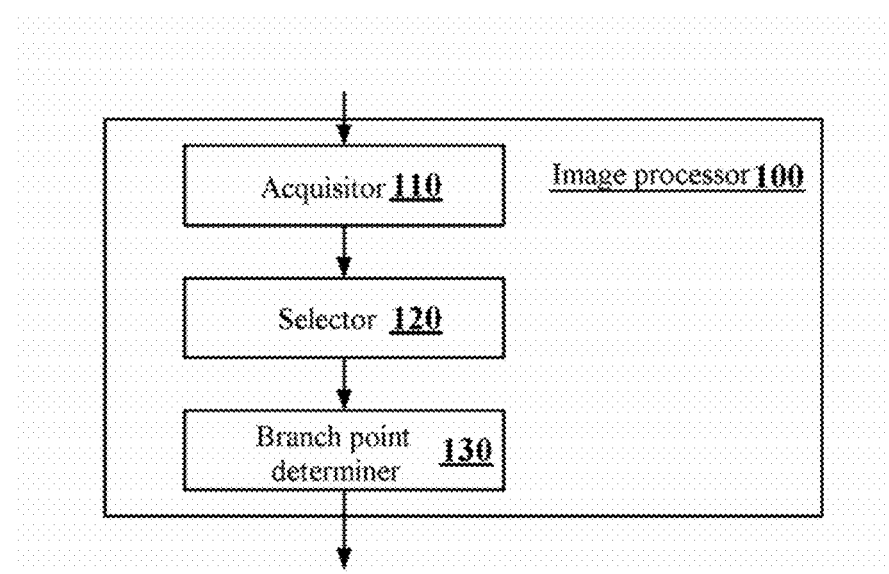
FIG. 1 is a structural block diagram showing an image processing device according to an embodiment of the present disclosure.

Although the present disclosure is susceptible to various modifications and substitutions, specific embodiments thereof are shown in the drawings as an example and are described in detail herein. However, it should be understood that the description for specific embodiments herein is not intended to limit the present disclosure as a disclosed particular form, but rather, the present disclosure aims to cover all modifications, equivalents and substitutions falling within the spirit and scope of the present disclosure. It should be noted that, throughout the drawings, a numeral indicates components corresponding to the numeral.

DETAILED DESCRIPTION

Examples of the present disclosure are described more fully with reference to the drawings now. The following description is merely exemplary substantively and is not intended to limit the present disclosure and an application or use thereof.

Exemplary embodiments are provided below to make the present disclosure thorough and to fully convey a scope of the present disclosure to those skilled in the art. Examples of various specific details, such as specific elements, devices, and methods, are set forth to provide thorough understanding for the embodiments of the present disclosure. It is apparent to those skilled in the art that the exemplary embodiments may be embodied in multiple different forms without using specific details, and should not be construed as limiting the scope of the present disclosure. In some exemplary embodiments, well-known processes, well-known structures, and well-known technology are not described in detail.

An image processing device 100 according to the present disclosure is described below with reference to FIG. 1.

The image processing device 100 according to the present disclosure includes an acquisitor 110, a selector 120, and a branch point determiner unit 130.

According to an embodiment of the present disclosure, the acquisitor 110 may acquire multiple slice images arranged in an order. Here, the acquisitor 110 may transmit the acquired multiple slice images to the selector 120.

According to an embodiment of the present disclosure, the selector 120 may detect the multiple slice images sequentially to determine a reference slice image and a reference trachea region in the reference slice image. Here, the selector 120 may acquire the multiple slice images from the acquisitor 110 and may transmit the determined reference slice image and the determined reference trachea region to the branch point determiner 130.

According to an embodiment of the present disclosure, the branch point determiner 130 may determine trachea regions of slice images following the reference slice image sequentially with the region growing method by using the reference trachea region as a seed region, and determine connectivity of the trachea regions of the slice images following the reference slice image sequentially, until a branch point slice image where a branch point between a trachea and bronchi is located is determined. Here, a trachea region of the branch point slice image includes two disconnected regions. According to an embodiment of the present disclosure, the branch point determiner 130 may acquire the reference slice image and the reference trachea region from the selector 120 and may output the determined branch point slice image.

It follows that, with the image processing device 100 according to the present disclosure, a reference slice image and a reference trachea region serving as a seed region can be determined in multiple slice images, and connectivity of trachea regions in slice images following the reference slice image can be determined sequentially with the region growing method, thereby determining a branch point slice image. In this way, the reference trachea region serving as the seed region can be automatically determined, thereby reducing manual intervention and improving accuracy of the seed region. Further, the branch point is determined based on the connectivity of the trachea regions, so that the determined branch point is more accurate and noise can be avoided, thereby detecting the lung region more accurately subsequently.

According to an embodiment of the present disclosure, the acquisitor 110 may acquire the multiple slice images by performing a computer tomography on a lung of a human body, and the multiple slice images may be arranged in an order from a head to feet of the human body. Since an object of the present disclosure is to determine the branch point between the trachea and the bronchi and the lung region, the multiple slice images may be multiple slice images including the trachea, the bronchi and the lung region, for example, from a neck to an abdomen of the human body, and in particular are multiple slice images of the lung of the human body. Further, the multiple slice images may be arranged in the order from the head to the feet of the human body. That is, the selector 120 and the branch point determiner 130 detect the slice images sequentially in the order from the head to the feet of the human body. In an exemplary embodiment, the computer tomography is performed on the lung of the human body to acquire multiple slice images, and the multiple slice images are arranged in the order from the head to the feet.

Figure 2:
FIG. 2 shows multiple slice images arranged in an order according to an embodiment of the present disclosure.

FIG. 2 shows multiple slice images arranged in an order according to an embodiment of the present disclosure. As shown in FIG. 2, the three slice images including the trachea region are numbered as N1, N2 and N3, respectively. Here, for convenience of description, only three slice images are shown, and the number of the multiple slice images may be more than three. In addition, the slice images shown in FIG. 2 include the trachea region, and slice images including a bronchial region and a lung region under the trachea region is not shown.

According to an embodiment of the present disclosure, after the acquisitor 110 acquires multiple slice images, the selector 120 may detect the multiple slice images sequentially to determine a reference slice image and a reference trachea region in the reference slice image. Here, the selector 120 may detect the multiple slice images sequentially in the order in which the slice images are arranged until the reference slice image and the reference trachea region are determined. That is, the selector 120 no longer detects slice images following the reference slice image after determining the reference slice image.

Figure 3:
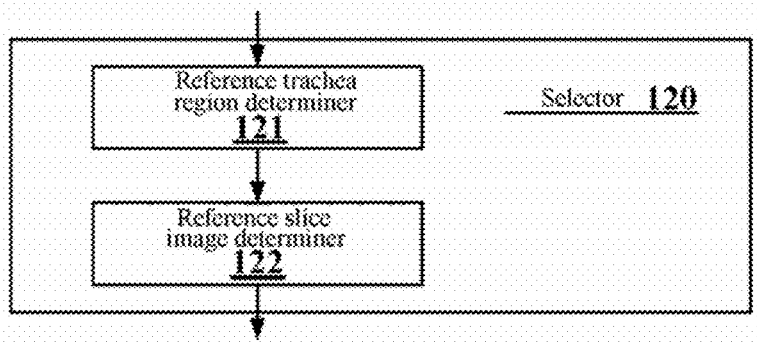
FIG. 3 is a structural block diagram showing a selector in an image processing device according to an embodiment of the present disclosure.

FIG. 3 is a structural block diagram showing the selector 120 in the image processing device 100 according to the embodiment of the present disclosure. As shown in FIG. 3, the selector 120 may include a reference trachea region determiner 121 and a reference slice image determiner 122.

According to an embodiment of the present disclosure, the reference trachea region determiner 121 may perform the following operations sequentially on each of the multiple slice images until the reference trachea region is determined: determining one or more hole regions in a thorax region of the slice image; and determining a hole region satisfying a first predetermined condition in the one or more hole regions as the reference trachea region.

That is, the reference trachea region determiner 121 may determine the hole region in the thorax region of the slice image sequentially starting from a first slice image, and determine whether there is a hole region satisfying the first predetermined condition. In a case where it is determined that there is a hole region satisfying the first predetermined condition, the hole region is determined as the reference trachea region.

According to an embodiment of the present disclosure, the reference trachea region determiner 121 may determine the thorax region of the slice image and may convert the thorax region of the slice image into a binary image.

Figure 4:
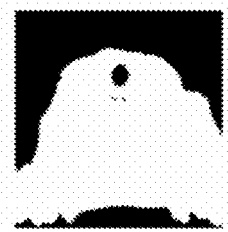
FIG. 4 shows a binary image of a slice image according to an embodiment of the present disclosure.

FIG. 4 shows a binary image of a slice image according to an embodiment of the present disclosure. As shown in FIG. 4, a white region represents the thorax region.

According to an embodiment of the present disclosure, the reference trachea region determiner 121 may determine one or more hole regions in the thorax region of the slice image. For example, the reference trachea region determiner 121 may determine a region or a point of which a pixel value is close to zero in the thorax region in the binary image as a hole region. For example, the thorax region in the binary image is searched for a pixel that a difference between a value of the pixel and 0 is smaller than a preset threshold, and a region or point constituted by the pixel is determined as a hole region. Here, the hole region may include one or more pixels. In a case where the hole region includes one pixel, the hole region actually is a point; and in a case where the hole region includes multiple pixels, the hole region is a region.

Figure 5:
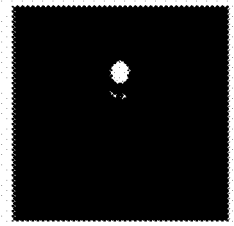
FIG. 5 shows a hole region in a thorax region of a slice image according to an embodiment of the present disclosure.

FIG. 5 shows a hole region in a thorax region of a slice image according to an embodiment of the present disclosure. As shown in a white portion of FIG. 5, the thorax region in FIG. 4 includes three hole regions.

According to an embodiment of the present disclosure, the reference trachea region determiner 121 may determine whether there is a hole region satisfying the first predetermined condition in the one or more hole regions.

According to an embodiment of the present disclosure, the first predetermined condition includes constraints on roundness, an air density and a size of the hole region. That is, the reference trachea region determiner 121 determines that a hole region whose roundness, air density and size satisfy a certain condition is the hole region satisfying the first predetermined condition, and determines the hole region as a reference trachea region. As a non-limiting example, for the hole region satisfying the first predetermined condition, it is required that roundness is greater than a roundness threshold, an air density is greater than an air density threshold, and a size is larger than a first size threshold and smaller than a second size threshold.

According to an embodiment of the present disclosure, the reference trachea region determiner 121 may calculate the roundness of the hole region by the following formula:

$$\text{Circularity}=4\pi S^2/C^2.$$

In which, Circularity represents the roundness of the hole region, S represents an area of the hole region, and C represents a perimeter of the hole region.

Here, the reference trachea region determiner 121 may determine that the roundness of the hole region satisfying the first predetermined condition satisfies the following condition:

$$\text{Circularity}>TH_C.$$

In which, $TH_C$ represents the roundness threshold and may be set according to actual needs.

According to an embodiment of the present disclosure, the reference trachea region determiner 121 may calculate the air density of the hole region by the following formula:

$$\text{Density}=N_{air}/N_{total}.$$

In which, Density represents the air density of the hole region, $N_{air}$ represents the number of pixels whose pixel values are within an air density range in the hole region, and $N_{total}$ represents the total number of pixels in the hole region. Here, a pixel value within the air density range may be set according to actual needs or based on an empirical value, and the number of the pixels whose pixel values are within the air density range in the hole region is calculated, thereby obtaining a value of $N_{air}$. Further, the number of the pixels in the hole region may also be calculated, thereby obtaining a value of $N_{total}$.

Here, the reference trachea region determiner 121 may determine that the air density of the hole region satisfying the first predetermined condition satisfies the following condition:

$$\text{Density}>TH_D.$$

In which, $TH_D$ represents the air density threshold and may be set according to actual needs.

According to an embodiment of the present disclosure, the reference trachea region determiner 121 may also determine that the size Size of the hole region satisfying the first predetermined condition satisfies the following condition:

$$TH_{S1}>\text{Size}>TH_{S2}.$$

In which, $TH_{S1}$ represents a second size threshold, $TH_{S2}$ represents a first size threshold, both of which may be set according to actual needs. Here, the size of the hole region may be characterized by various parameters, such as an area of the hole region, a radius of a circumscribed circle, and a length and a width of a circumscribed rectangle, and the parameters are not limited in the present disclosure.

An example in which the reference trachea region determiner 121 determines the reference trachea region is described above. However, the embodiment is not limitative, and the reference trachea region determiner 121 may also determine the reference trachea region in other ways. As described above, the reference trachea region determiner 121 may sequentially determine whether there is a hole region satisfying the first predetermined condition in the subsequent slice images starting from the first slice image. In a case where it is determined that there is a hole region satisfying the first predetermined condition, the hole region is determined as the reference trachea region.

According to an embodiment of the present disclosure, the reference slice image determiner 122 may determine a slice image where the reference trachea region is located as a reference slice image.

Figure 6:
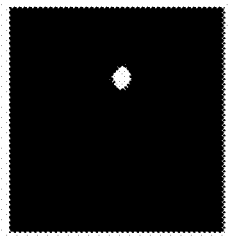
FIG. 6 shows a reference trachea region determined according to an embodiment of the present disclosure.

FIG. 6 shows a reference trachea region determined according to an embodiment of the present disclosure. As shown in FIG. 6, in a case where the larger hole in FIG. 5 is determined as the reference trachea region, the slice image shown in FIG. 5 is the reference slice image.

According to an embodiment of the present disclosure, after the selector 120 determines the reference trachea region and the reference slice image, the branch point determiner 130 may perform, starting from the reference slice image, the following operations sequentially on slice images following the reference slice image until a branch point slice image where the branch point between the trachea and the bronchi is located is determined: determining a trachea region of a current slice image with the region growing method by using a trachea region of a previous slice image as the seed region; and determining connectivity of the trachea region of the current slice image. Here, the trachea region of the branch point slice image includes two disconnected regions.

For example, the branch point determiner 130 may determine a trachea region of a slice image immediately following the reference slice image with the region growing method by using the reference trachea region in the reference slice image as the seed region, and determine connectivity of the trachea region of the slice image immediately following the reference slice image. In a case where the trachea region of the slice image immediately following the reference slice image does not include two disconnected regions, a trachea region of a next slice image is determined with the region growing method by using the trachea region of the slice image immediately following the reference slice image as the seed region, and it is determined whether the trachea region of the next slice image includes two disconnected regions. The above operations are repeated until a trachea region including two disconnected regions is found. Next, the branch point determiner 130 may determine a slice image where the found trachea region including two disconnected regions is located as a branch point slice image.

Figure 7:
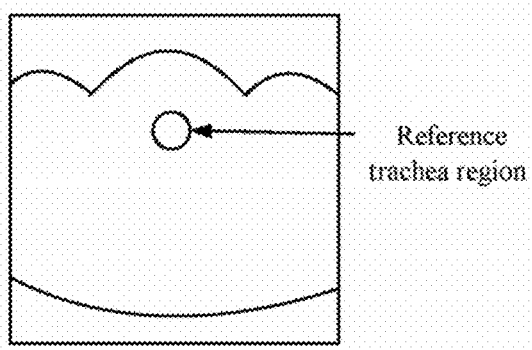
FIG. 7 is a schematic diagram showing a slice image N1 in FIG. 2.
Figure 8:
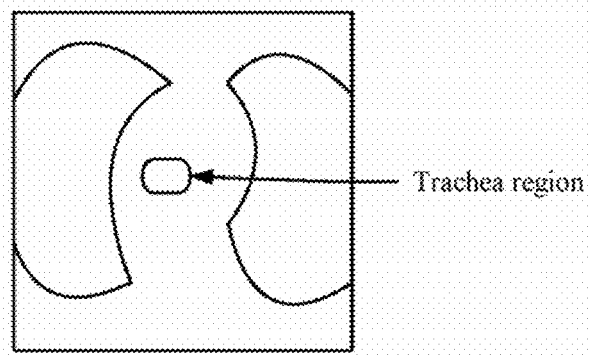
FIG. 8 is a schematic diagram showing a slice image N2 in FIG. 2.
Figure 9:
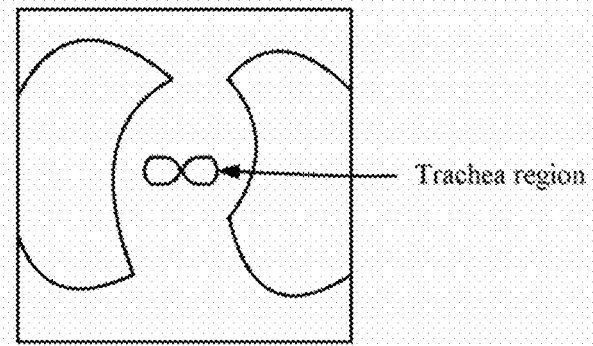
FIG. 9 is a schematic diagram showing a slice image N3 in FIG. 2.

The operation of the branch point determiner 130 is described in detail below with reference to FIGS. 7 to 9. FIGS. 7, 8 and 9 show schematic views of the slice image N1, the slice image N2, and the slice image N3 in FIG. 2, respectively.

Here, it is assumed that the slice image N1 is the reference slice image, and FIG. 7 shows a reference trachea region in the slice image N1, where the reference trachea region is located in a thorax. According to an embodiment of the present disclosure, the branch point determiner 130 may determine a trachea region in the slice image N2 with the region growing method by using the reference trachea region as a seed region, as shown in FIG. 8. In FIG. 8, the trachea region in the slice image N2 is located between a left lung and a right lung. Next, the branch point determiner 130 determines connectivity of the trachea region in the slice image N2 to determine that the trachea region does not include two disconnected regions. Next, the branch point determiner 130 determines a trachea region in the slice image N3 with the region growing method by using the trachea region in the slice image N2 as a seed region, as shown in FIG. 9. Next, the branch point determiner 130 determines connectivity of the trachea region in the slice image N3 to determine that the trachea region includes two disconnected regions. According to an embodiment of the present disclosure, the branch point determiner 130 determines that the slice image N3 is the branch point slice image. Further, after the branch point slice image is determined, the branch point determiner 130 stops detecting slice images following the branch point slice image.

As described above, the branch point determiner 130 may determine a branch point slice image where the branch point is located. Here, the branch point slice image may be represented, for example, by a serial number of the slice image. Further, the branch point determiner 130 may also determine a position of the branch point in the branch point slice image.

According to an embodiment of the present disclosure, the branch point determiner 130 may determine the position of the branch point in the branch point slice image by the following operations: determining two centroids of the two disconnected regions included in the trachea region of the branch point slice image, respectively; and determining a midpoint of a line connecting the two centroids as the position of the branch point in the branch point slice image. For example, the branch point determiner 130 may determine two centroids of the two disconnected regions shown in FIG. 9 and determine a midpoint of a line connecting the two centroids as the position of the branch point in the branch point slice image.

According to an embodiment of the present disclosure, the branch point determiner 130 may also determine the position of the branch point in the branch point slice image by the following operations: determining points that are closest to each other respectively in the two disconnected regions included in the trachea region of the branch point slice image; and determining a midpoint of a line connecting the points closest to each other as the position of the branch point in the branch point slice image.

Two embodiments in which the branch point determiner 130 determines the position of the branch point in the branch point slice image are described above. It is to be noted that the two embodiments are merely exemplary and not restrictive. Practically, the branch point determiner 130 may also determine the position of the branch point in the branch point slice image by other ways. Here, the position of the branch point in the branch point slice image may be represented, for example, by two-dimensional coordinates.

With the image processing device 100 according to the present disclosure, the position of the branch point, including the branch point slice image where the branch point is located and the position of the branch point in the branch point slice image, can be determined. It follows that, the seed region determined in the present disclosure is automatically acquired by the selector 120 and is not manually specified, thereby reducing manual intervention and improving accuracy of the seed region. Further, the branch point determiner 130 neither uses the thinning algorithm, nor determines skeletal structures of an entire trachea and a lung region, instead, the branch point determiner 130 stops detecting other slice images after the branch point is detected, so that the determined branch point is more accurate and noise is avoided, thereby detecting the lung region more accurately subsequently.

The process of determining the position of the branch point between the trachea and the bronchi by the image processing device 100 according to the embodiment of the present disclosure is described in detail above. According to an embodiment of the present disclosure, the image processing device 100 may also determine a lung region.

Figure 10:
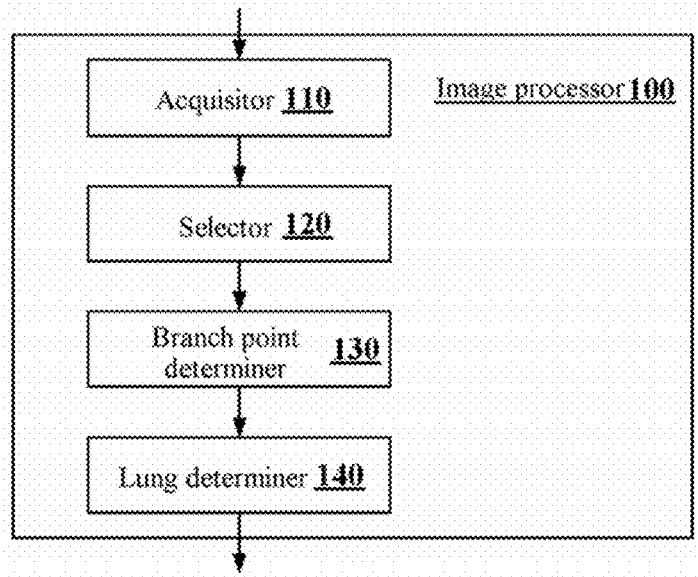
FIG. 10 is a structural block diagram showing an image processing device according to another embodiment of the present disclosure.

FIG. 10 is a structural block diagram showing an image processing device according to another embodiment of the present disclosure. As shown in FIG. 10, the image processing device 100 may include an acquisitor 110, a selector 120, a branch point determiner 130, and a lung determiner 140. Here, the acquisitor 110, the selector 120, and the branch point determiner 130 are described in detail above, and are not described here.

According to an embodiment of the present disclosure, the lung determiner 140 may determine, starting from the branch point slice image, lung regions of slice images preceding and following the branch point slice image (including the branch point slice image) with the region growing method by using the two disconnected regions included in the trachea region of the branch point slice image as seed regions.

As described above, the branch point determiner 130 may determine the two disconnected regions included in the trachea region of the branch point slice image. According to an embodiment of the present disclosure, the lung determiner 140 may acquire the branch point slice image (e.g., the serial number of the slice image) and the two disconnected regions included in the trachea region of the branch point slice image from the branch point determiner 130. Next, the lung determiner 140 may determine, starting from the branch point slice image, the lung region in a direction indicated by an order in which the slice images are arranged and an opposite direction with the region growing method by using the two disconnected regions as seed regions.

Here, the process in which the lung determiner 140 determines the lung region with the region growing method is similar to the process in which the branch point determiner 130 determines the trachea region. That is, a lung region of a current slice image is searched for by using a lung region of a previous slice image as a seed region. The difference between the two processes is as follows: the branch point determiner 130 determines, starting from the reference slice image, the trachea regions sequentially in the order in which the slice images are arranged, that is, determining the trachea regions only in the direction indicated by the order in which the slice images are arranged; while the lung determiner 140 determines, starting from the branch point slice image, the lung region in the direction indicated by the order in which the slice images are arranged and the opposite direction.

In addition, another difference of the process in which the lung determiner 140 determines the lung region with the region growing method with respect to the process in which the branch point determiner 130 determines the trachea region is that different thresholds are used in the region growing method.

It is well known that a main principle of the region growing method is as follows: a position of a seed region and pixel values of pixels included in the seed region are known, pixels whose pixel values are similar to the pixel values of the pixels in the seed region are searched for from a connected region around the seed region, and a region constituted by such pixels is determined as a next seed region, to continue searching. The region growing method used in the present disclosure can be applied to a 3D field, that is, pixels satisfying the condition are searched for in all directions around the seed region. In general, pixels whose pixel values are similar to the pixel values in the seed region are determined by setting a threshold. That is, in a case where a difference between a pixel value of a pixel and the pixel values of the pixels in the seed region is smaller than the preset threshold, a region constituted by such pixel may be used as a next seed region. It can be seen that a threshold is an important parameter in the region growing method.

In the field, in a case where the trachea region is determined with the region growing method, since a density of a lung tissue is close to a density of a trachea region, the trachea region is easily "leaked" into the lung region, resulting in that the lung region is determined as the trachea region by mistake. This effect is called a "leakage" characteristic of the region growing method. The "leakage" characteristic of the region growing method is utilized in the present disclosure, that is, after the trachea region is determined, the lung region is determined with the region growing method by using a connected region of a branch point as a seed region. However, the trachea is filled with air and the lung region has components such as alveoli and tissue other than the air, therefore, although the trachea region is similar to the lung region in density, the trachea region is not exactly the same with the lung region. Therefore, in the present disclosure, thresholds used in the region growing method should be different in determining the trachea region and the lung region.

According to an embodiment of the present disclosure, for determining the trachea region with the region growing method, the branch point determiner 130 uses a first threshold as a threshold of a pixel difference, and for determining the lung region with the region growing method, the lung determiner 140 uses a second threshold as the threshold of the pixel difference, where the second threshold is greater than the first threshold.

That is, a determining condition used in determining the lung region with the region growing method is more lenient than a determining condition in determining the trachea region.

Here, the first threshold and the second threshold may be reasonably set so that the branch point determiner 130 can accurately determine the trachea region and the lung determiner 140 can accurately determine the lung region. Preferably, a difference between the second threshold and the first threshold is greater than or equal to 200. More preferably, the first threshold is 100 and the second threshold is 300.

As described above, the lung determiner 140 can determine lung regions in the branch point slice image, and slice images preceding and following the branch point slice image with the region growing method.

According to an embodiment of the present disclosure, the branch point determiner 140 can determine a three-dimensional shape of the trachea based on a trachea region in each of slice images (including the reference slice image and the branch point slice image) between the reference slice image and the branch point slice image, and the lung determiner 140 can determine a three-dimensional shape of the lung based on the lung regions in the branch point slice image, and slice images preceding and following the branch point slice image. Further, according to an embodiment of the present disclosure, the lung determiner 140 may output a three-dimensional image of the lung from the image processing device 100.

Figure 11:
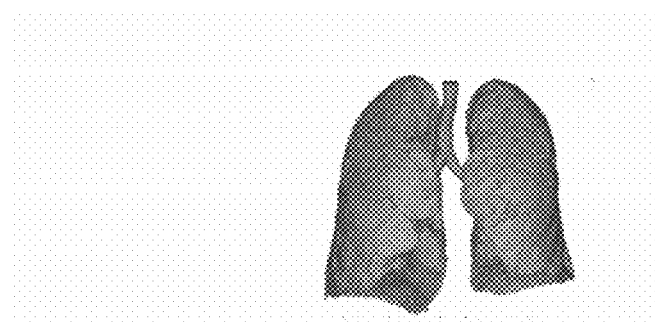
FIG. 11 shows three-dimensional shapes of a trachea and a lung determined according to an embodiment of the present disclosure.
Figure 12:
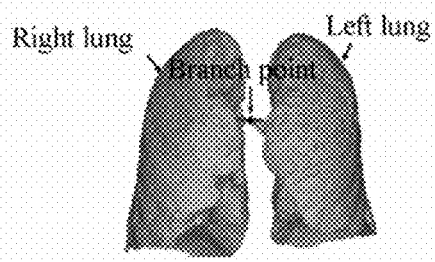
FIG. 12 shows a three-dimensional shape of a lung determined according to an embodiment of the present disclosure.

FIG. 11 shows a three-dimensional shape of a trachea and a lung determined according to an embodiment of the present disclosure. FIG. 12 shows a three-dimensional shape of a lung determined according to an embodiment of the present disclosure. In FIG. 12, the trachea region is removed, and only the three-dimensional shape of the lung is shown.

According to an embodiment of the present disclosure, the lung determiner 140 may also determine three-dimensional shapes of a left lung and a right lung based on the three-dimensional shape of the lung and the position of the branch point. That is, the lung determiner 140 may determine that the left lung is located in a region on a left side of the branch point and the right lung is located in a region on a right side of the branch point.

According to an embodiment of the present disclosure, the lung determiner 140 may also determine an upper edge and a lower edge of the left lung based on the three-dimensional shape of the left lung, and determine an upper edge and a lower edge of the right lung based on the three-dimensional shape of the right lung. Specifically, the lung determiner 140 may determine a slice image where the upper edge of the left lung is located, a slice image where the lower edge of the left lung is located, a slice image where the upper edge of the right lung is located, and a slice image where the lower edge of the right lung is located. Here, for example, the slice image where the upper edge of the left lung is located, the slice image where the lower edge of the left lung is located, the slice image where the upper edge of the right lung is located, and the slice image where the lower edge of the right lung is located can be represented by the serial numbers of the slice images.

As described above, with the image processing device 100 according to the present disclosure, the three-dimensional shape of the lung can be determined, and a position of the lung, including the slice image where the upper edge of the left lung is located, the slice image where the lower edge of the left lung is located, the slice image where the upper edge of the right lung is located, and the slice image where the lower edge of the right lung is located, can be determined. It follows that, in the present disclosure, the lung region is extracted by utilizing the "leakage" characteristic of the region growing method, and the lung region is gradually searched for by using the trachea region of the branch point slice image as a seed region, thereby fully considering position information of the lung, avoiding an erroneous detection to other portions, and thus detecting the lung region more accurately.

The image processing device 100 according to the embodiment of the present disclosure is described in detail above. Next, an image processing method according to an embodiment of the present disclosure is described in detail.

Figure 13:
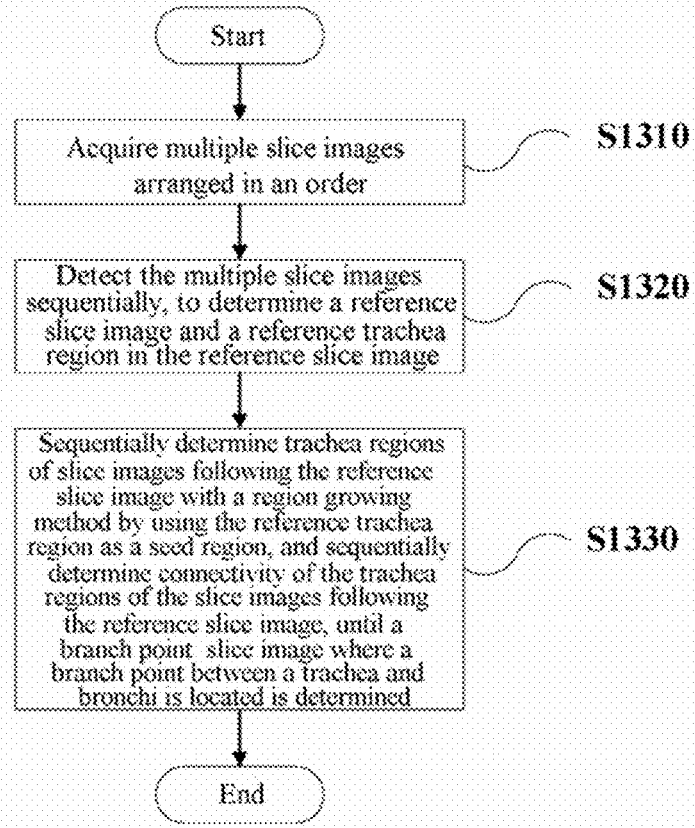
FIG. 13 is a flow chart showing an image processing method according to an embodiment of the present disclosure.

FIG. 13 is a flow chart showing an image processing method according to an embodiment of the present disclosure.

As shown in FIG. 13, in step S1310, multiple slice images arranged in an order are acquired.

Next, in step S1320, the multiple slice images are detected sequentially to determine a reference slice image and a reference trachea region in the reference slice image.

Next, in step S1330, trachea regions of slice images following the reference slice image are determined sequentially with the region growing method by using the reference trachea region as a seed region, and connectivity of the trachea regions of the slice images following the reference slice image is determined sequentially, until a branch point slice image where a branch point between a trachea and bronchi is located is determined.

Here, the trachea region of the branch point slice image includes two disconnected regions.

Preferably, the process of determining the reference slice image and the reference trachea region includes performing the following operations sequentially on each of the multiple slice images until the reference trachea region is determined: determining one or more hole regions in a thorax region of the slice image; determining a hole region satisfying a first predetermined condition in the one or more hole regions as a reference trachea region; and determining a slice image where the reference trachea region is located as the reference slice image.

Preferably, the first predetermined condition includes constraints on roundness, an air density and a size of the hole region.

Preferably, the method further includes: determining a position of the branch point in the branch point slice image.

Preferably, the process of determining the position of the branch point in the branch point slice image includes: determining two centroids of the two disconnected regions included in the trachea region of the branch point slice image, respectively; and determining a midpoint of a line connecting the two centroids as the position of the branch point in the branch point slice image.

Preferably, the method further includes: determining, starting from the branch point slice image, lung regions of the branch point slice image, and slice images preceding and following the branch point slice image with the region growing method by using the two disconnected regions included in the trachea region of the branch point slice image as seed regions.

Preferably, the process of determining the trachea region with the region growing method includes using a first threshold as a threshold of a pixel difference, and the process of determining the lung region with the region growing method includes using a second threshold as the threshold of the pixel difference, where the second threshold is greater than the first threshold.

Preferably, the method further includes: determining a three-dimensional shape of a lung based on the lung regions determined with the region growing method; determining three-dimensional shapes of a left lung and a right lung based on the three-dimensional shape of the lung and a position of the branch point; and determining an upper edge and a lower edge of the left lung based on the three-dimensional shape of the left lung, and determining an upper edge and a lower edge of the right lung based on the three-dimensional shape of the right lung.

Preferably, the process of determining the upper edge and the lower edge of the left lung includes: determining a slice image where the upper edge of the left lung is located and determining a slice image where the lower edge of the left lung is located, and the process of determining the upper edge and the lower edge of the right lung includes: determining a slice image where the upper edge of the right lung is located and determining a slice image where the lower edge of the right lung is located.

The image processing method described above can be realized by the image processing device 100 according to the embodiment of the present disclosure. Therefore, the various embodiments of the image processing device 100 described above are suitable here, and are not repeated here.

It follows that, with the image processing device and the image processing method according to the present disclosure, the reference trachea region serving as a seed region can be automatically determined, thereby reducing manual intervention and improving accuracy of the seed region. Further, the branch point is determined based on the connectivity of the trachea region, so that the determined branch point is more accurate and the noise is avoided, thereby detecting the lung region more accurately subsequently. In addition, the lung region is extracted by utilizing the "leakage" characteristic of the region growing method, and the lung region is gradually searched for by using the trachea region of the branch point slice image as a seed region, thereby fully considering position information of the lung, and thus avoiding an erroneous detection to other portions. In summary, the branch point and the lung region can be detected more accurately with the image processing device and the image processing method according to the present disclosure.

It is apparent that various operations of the image processing method according to the present disclosure may be implemented in a manner of computer-executable programs stored in various machine-readable storage mediums.

In addition, the object of the present disclosure can also be achieved by: directly or indirectly providing a storage medium storing the above-described executable program codes to a system or a device; and reading and executing the above-described program codes by a computer or a central processing unit (CPU) in the system or the device. As long as the system or the device has a function of executing a program, the embodiment of the present disclosure is not limited to the program, and the program may be in any form such as a target program, a program executed by an interpreter or a script program provided to the operating system.

The above machine-readable storage mediums include but are not limited to, various memory and storage units, semiconductor devices, disk units such as an optical disk, a magnetic disk and a magneto-optical disk, and other medium suitable for storing information.

In addition, the computer may also implement the technical solution of the present disclosure by connecting to a corresponding website on the Internet, downloading and installing the computer program codes according to the present disclosure to the computer and executing the program codes.

Figure 14:
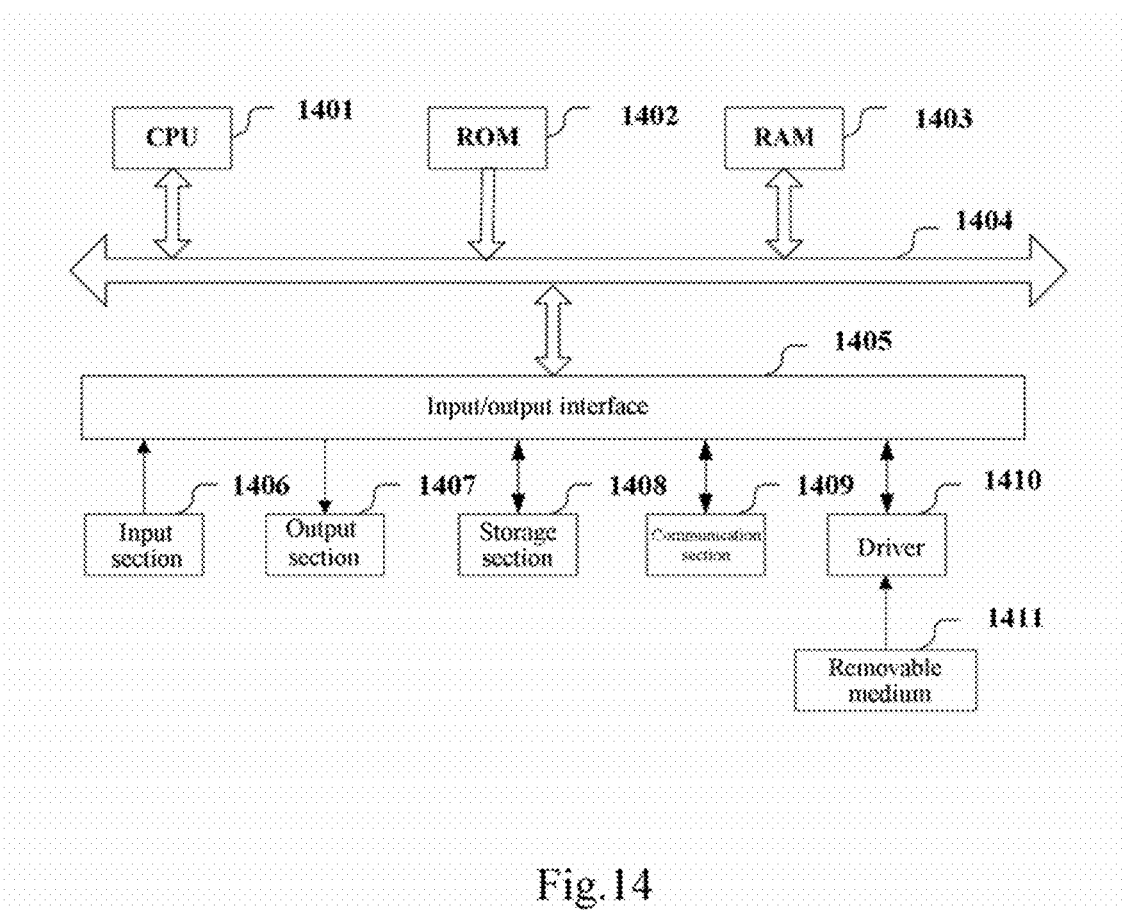
FIG. 14 is a block diagram of an exemplary structure of a general purpose personal computer which can implement the image processing method according to the present disclosure.

FIG. 14 is a block diagram of an exemplary structure of a general purpose personal computer which can implement the image processing method according to the present disclosure.

As shown in FIG. 14, a CPU 1401 performs various processing according to a program stored in a read-only memory (ROM) 1402 or a program loaded to a random access memory (RAM) 1403 from a storage section 1408. Data required for various processing of the CPU 1401 is also stored in the RAM 1403 as needed. The CPU 1401, the ROM 1402, and the RAM 1403 are connected to each other via a bus 1404. An input/output interface 1405 is also connected to the bus 1404.

The following components are connected to the input/output interface 1405: an input section 1406 (including a keyboard, a mouse, etc.), an output section 1407 (including a display such as a cathode ray tube (CRT), a liquid crystal display (LCD), and a loudspeaker, etc.), the storage section 1408 (including a hard disk, etc.), a communication section 1409 (including a network interface card such as a LAN card, a modem, etc.). The communication section 1409 performs communication processing via a network such as the Internet. A driver 1410 may also be connected to the input/output interface 1405 as needed. A removable medium 1411 such as a magnetic disk, an optical disk, a magneto-optical disk, a semiconductor memory is installed in the driver 1410 as needed, so that a computer program read there from is installed in the storage section 1408 as needed.

In a case that the above-described series of processing is implemented with software, a program constituting the software is installed from a network such as the Internet or a storage medium such as the removable medium 1411.

It should be understood by those skilled in the art that the storage medium is not limited to the removable medium 1411 shown in FIG. 14, which has a program stored therein and is distributed separately from the device to provide the program to the user. An example of the removable medium 1411 includes a magnetic disk (including a floppy disk (registered trademark)), an optical disk (including a compact disk read only memory (CD-ROM) and a digital versatile disk (DVD)), a magneto-optical disk (including a mini-disc (MD) (registered trademark)) and a semiconductor memory. Alternatively, the storage medium may be a ROM 1402, a hard disk included in the storage section 1408, etc., which has a program stored therein and is distributed to the user along with a device including the storage medium.

In the system and the method of the present disclosure, it is apparent that units or steps can be decomposed and/or recombined. These decomposition and/or recombination shall be considered as equivalents of the present disclosure. Also, steps for executing the above-described series of processing may be naturally performed in chronological order in the order described, but are not necessarily performed in chronological order. Some steps may be performed in parallel or independently from each other.

Although the embodiments of the present disclosure have been described above in detail with reference to the drawings, it should be understood that the above-described embodiments are merely used for illustrating the present disclosure and are not intended to limit the present disclosure. Those skilled in the art can make various modifications and variations to the above-described embodiments without departing from the substance and scope of the present disclosure. Accordingly, the scope of the present disclosure is defined only by the appended claims and their equivalents.

With respect to implementations including the above embodiments, the following items are further disclosed:

Item 1. An image processing device, including:

an acquisitor configured to acquire multiple slice images arranged in an order;

a selector configured to detect the multiple slice images sequentially, to determine a reference slice image and a reference trachea region in the reference slice image; and a branch point determiner configured to determine, with a region growing method, trachea regions of slice images following the reference slice image sequentially by using the reference trachea region as a seed region, and determine connectivity of the trachea regions of the slice images following the reference slice image sequentially, until a branch point slice image where a branch point between a trachea and bronchi is located is determined, wherein a trachea region of the branch point slice image includes two disconnected regions.

Item 2. The image processing device according to item 1, wherein the selector includes:

a reference trachea region determiner configured to perform the following operations sequentially on each of the multiple slice images, until the reference trachea region is determined: determining one or more hole regions in a thorax region of the slice image; and determining a hole region satisfying a first predetermined condition in the one or more hole regions as the reference trachea region; and a reference slice image determiner configured to determine a slice image where the reference trachea region is located as the reference slice image.

Item 3. The image processing device according to item 2, wherein the first predetermined condition includes constraints on roundness, an air density and a size of the hole region.

Item 4. The image processing device according to item 1, wherein the branch point determiner is further configured to determine a position of the branch point in the branch point slice image.

Item 5. The image processing device according to item 4, wherein the branch point determiner is configured to determine the position of the branch point in the branch point slice image through the following operations:

determining two centroids of the two disconnected regions included in the trachea region of the branch point slice image respectively; and determining a midpoint of a line connecting the two centroids as the position of the branch point in the branch point slice image.

Item 6. The image processing device according to item 1, wherein the image processor further includes a lung determiner configured to determine, starting from the branch point slice image and utilizing the region growing method, lung regions of the branch point slice image, and slice images preceding and following the branch point slice image, by using the two disconnected regions included in the trachea region of the branch point slice image as seed regions.

Item 7. The image processing device according to item 6, wherein, for determining the trachea region with the region growing method, the branch point determiner is further configured to use a first threshold as a threshold of a pixel difference, and for determining the lung region with the region growing method, the lung determiner is further configured to use a second threshold as a threshold of a pixel difference, and wherein the second threshold is greater than the first threshold.

Item 8. The image processing device according to item 6, wherein the lung determiner is further configured to:

determine a three-dimensional shape of a lung based on the lung regions determined with the region growing method;

determine three-dimensional shapes of a left lung and a right lung based on the three-dimensional shape of the lung and a position of the branch point; and determine an upper edge and a lower edge of the left lung based on the three-dimensional shape of the left lung, and determine an upper edge and a lower edge of the right lung based on the three-dimensional shape of the right lung.

Item 9. The image processing device according to item 8, wherein the lung determiner is further configured to determine a slice image where the upper edge of the left lung is located, a slice image where the lower edge of the left lung is located, a slice image where the upper edge of the right lung is located, and a slice image where the lower edge of the right lung is located.

Item 10. The image processing device according to item 1, wherein the acquisitor acquires the multiple slice images by performing a computer tomography on a lung of a human body.

Item 11. An image processing method, including:

acquiring multiple slice images arranged in an order;

detecting the multiple slice images sequentially, to determine a reference slice image and a reference trachea region in the reference slice image; and determining, with a region growing method, trachea regions of slice images following the reference slice image sequentially by using the reference trachea region as a seed region, and determining connectivity of the trachea regions of the slice images following the reference slice image sequentially, until a branch point slice image where a branch point between a trachea and bronchi is located is determined, where a trachea region of the branch point slice image includes two disconnected regions.

Item 12. The image processing method according to item 11, wherein the determining the reference slice image and the reference trachea region includes:

performing the following operations sequentially on each of the multiple slice images, until the reference trachea region is determined:

determining one or more hole regions in a thorax region of the slice image;

determining a hole region satisfying a first predetermined condition in the one or more hole regions as the reference trachea region; and determining a slice image where the reference trachea region is located as the reference slice image.

Item 13. The image processing method according to item 12, wherein the first predetermined condition includes constraints on roundness, an air density and a size of the hole region.

Item 14. The image processing method according to item 11, wherein the method further includes determining a position of the branch point in the branch point slice image.

Item 15. The image processing method according to item 14, wherein the determining the position of the branch point in the branch point slice image includes:

determining two centroids of the two disconnected regions included in the trachea region of the branch point slice image respectively; and determining a midpoint of a line connecting the two centroids as the position of the branch point in the branch point slice image.

Item 16. The image processing method according to item 11, wherein the method further includes:

determining, starting from the branch point slice image and utilizing the region growing method, lung regions of the branch point slice image, and slice images preceding and following the branch point slice image by using the two disconnected regions included in the trachea region of the branch point slice image as seed regions.

Item 17. The image processing method according to item 16, wherein the determining the trachea region with the region growing method includes using a first threshold as a threshold of a pixel difference, and the determining the lung region with the region growing method includes using a second threshold as the threshold of the pixel difference, where the second threshold is greater than the first threshold.

Item 18. The image processing method according to item 16, wherein the method further includes:

determining a three-dimensional shape of a lung based on the lung regions determined with the region growing method;

determining three-dimensional shapes of a left lung and a right lung based on the three-dimensional shape of the lung and a position of the branch point; and determining an upper edge and a lower edge of the left lung based on the three-dimensional shape of the left lung, and determine an upper edge and a lower edge of the right lung based on the three-dimensional shape of the right lung.

Item 19. The image processing method according to item 18, wherein the determining the upper edge and the lower edge of the left lung includes determining a slice image where the upper edge of the left lung is located and determining a slice image where the lower edge of the left lung is located, and the determining the upper edge and the lower edge of the right lung includes determining a slice image where the upper edge of the right lung is located and determining a slice image where the lower edge of the right lung is located.

Item 20. A machine-readable storage medium, carrying a program product storing machine-readable instruction codes, where when being read and executed by a computer, the instruction codes enable the computer to perform the image processing method according to any one of items 11 to 19.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An image processing device, including:
   an acquisitor configured to acquire multiple slice images arranged in an order;
   a selector configured to detect the multiple slice images sequentially, to determine a reference slice image and a reference trachea region in the reference slice image; and
   a branch point determiner configured to determine, with a region growing method, trachea regions of slice images following the reference slice image sequentially by using the reference trachea region as a seed region, and determine connectivity of the trachea regions of the slice images following the reference slice image sequentially, until a branch point slice image where a branch point between a trachea and bronchi is located is determined,
   wherein a trachea region of the branch point slice image includes two disconnected regions,
   wherein the image processing device further includes a lung determiner configured to determine, starting from the branch point slice image and utilizing the region growing method, lung regions of the branch point slice image, and slice images preceding and following the branch point slice image, by using the two disconnected regions included in the trachea region of the branch point slice image as seed regions, and
   wherein, for determining the trachea region with the region growing method, the branch point determiner is further configured to use a first threshold as a threshold of a pixel difference, and for determining the lung region with the region growing method, the lung determiner is further configured to use a second threshold as a threshold of the pixel difference, and wherein the second threshold is greater than the first threshold.

2. The image processing device according to claim 1, where the selector includes:
   a reference trachea region determiner configured to perform operations sequentially on each of the multiple slice images, until the reference trachea region is determined by: determining one or more hole regions in a thorax region of the slice image and determining a hole region satisfying a first predetermined condition in the one or more hole regions as the reference trachea region; and
   a reference slice image determiner configured to determine a slice image where the reference trachea region is located as the reference slice image.

3. The image processing device according to claim 2, wherein the first predetermined condition includes constraints on roundness, an air density and a size of the one or more hole regions.

4. The image processing device according to claim 1, wherein the branch point determiner is further configured to determine a position of the branch point in the branch point slice image.

5. The image processing device according to claim 4, wherein the branch point determiner is configured to determine the position of the branch point in the branch point slice image by:
   determining two centroids of the two disconnected regions included in the trachea region of the branch point slice image respectively; and
   determining a midpoint of a line connecting the two centroids as the position of the branch point in the branch point slice image.

6. The image processing device according to claim 1, wherein the lung determiner is further configured to:
   determine a three-dimensional shape of a lung based on the lung regions determined with the region growing method;
   determine three-dimensional shapes of a left lung and a right lung based on the three-dimensional shape of the lung and a position of the branch point; and
   determine an upper edge and a lower edge of the left lung based on the three-dimensional shape of the left lung, and determine a upper edge and a lower edge of the right lung based on the three-dimensional shape of the right lung.

7. The image processing device according to claim 6, wherein the lung determiner is further configured to determine the slice image where the upper edge of the left lung is located, the slice image where the lower edge of the left lung is located, the slice image where the upper edge of the right lung is located, and the slice image where the lower edge of the right lung is located.

8. The image processing device according to claim 1, wherein the acquisitor acquires the multiple slice images by performing a computer tomography on a lung of a human body.

9. An image processing method, including:
   acquiring multiple slice images arranged in an order;
   detecting the multiple slice images sequentially, to determine a reference slice image and a reference trachea region in the reference slice image; and
   determining, with a region growing method, trachea regions of slice images following the reference slice image sequentially by using the reference trachea region as a seed region, and determining connectivity of the trachea regions of the slice images following the reference slice image sequentially, until a branch point slice image where a branch point between a trachea and bronchi is located is determined, wherein a trachea region of the branch point slice image includes two disconnected regions, wherein the method further includes: determining, starting from the branch point slice image and utilizing the region growing method, lung regions of the branch point slice image, and slice images preceding and following the branch point slice image by using the two disconnected regions included in the trachea region of the branch point slice image as seed regions, and wherein the determining the trachea region with the region growing method includes using a first threshold as a threshold of a pixel difference, and the determining the lung region with the region growing method includes using a second threshold as the threshold of the pixel difference, wherein the second threshold is greater than the first threshold.

10. The image processing method according to claim 9, wherein the determining the reference slice image and the reference trachea region includes:

performing operations sequentially on each of the multiple slice images, until the reference trachea region is determined by:

determining one or more hole regions in a thorax region of the slice image;

determining a hole region satisfying a first predetermined condition in the one or more hole regions as the reference trachea region; and determining a slice image where the reference trachea region is located as the reference slice image.

11. The image processing method according to claim 10, wherein the first predetermined condition includes constraints on roundness, an air density and a size of the hole region.

12. The image processing method according to claim 9, wherein the method further includes determining a position of the branch point in the branch point slice image.

13. The image processing method according to claim 12, wherein the determining the position of the branch point in the branch point slice image includes:

determining two centroids of the two disconnected regions included in the trachea region of the branch point slice image respectively; and determining a midpoint of a line connecting the two centroids as the position of the branch point in the branch point slice image.

14. The image processing method according to claim 9, wherein the method further includes;

determining a three-dimensional shape of a lung based on the lung regions determined with the region growing method;

determining three-dimensional shapes of a left lung and a right lung based on the three-dimensional shape of the lung and a position of the branch point; and determining an upper edge and a lower edge of the left lung based on the three-dimensional shape of the left lung, and determine a upper edge and a lower edge of the right lung based on the three-dimensional shape of the right lung.

15. The image processing method according to claim 14, wherein the determining the upper edge and the lower edge of the left lung includes determining the slice image where the upper edge of the left lung is located and determining the slice image where the lower edge of the left lung is located, and the determining the upper edge and the lower edge of the right lung includes determining the slice image where the upper edge of the right lung is located and determining the slice image where the lower edge of the right lung is located.

16. A non-transitory machine-readable storage medium storing a program including storing machine-readable instruction codes when read and executed by a computer, the instruction codes enable the computer to perform the image processing method according to claim 9.

* * * * *